United States Patent
Wang et al.

(10) Patent No.: US 7,655,059 B2
(45) Date of Patent: Feb. 2, 2010

(54) QUICKLY ASSEMBLABLE STRUCTURE OF MOLECULAR SIEVES AND CAN FILTERS IN OXYGEN CONCENTRATOR

(75) Inventors: Shiow-Chen Wang, Taipei (TW); Wen-Feng Yang, Hsinchu County (TW); Wen-Ching Wu, Hsinchu (TW)

(73) Assignee: Treatyou Medical Technology Corporation, Thubei (TW)

( * ) Notice: Subject to any disclaimer, the term of this patent is extended or adjusted under 35 U.S.C. 154(b) by 239 days.

(21) Appl. No.: 11/984,784

(22) Filed: Nov. 21, 2007

(65) Prior Publication Data
US 2008/0314006 A1    Dec. 25, 2008

(30) Foreign Application Priority Data
Jun. 22, 2007    (TW) .............................. 96122493 A

(51) Int. Cl.
*B01D 50/00* (2006.01)
(52) U.S. Cl. .................... 55/385.1; 128/200.24; 96/134; 96/135; 96/136; 96/138; 96/147
(58) Field of Classification Search ................ 55/385.1; 128/200.24; 96/134–136, 138, 147
See application file for complete search history.

(56) References Cited
U.S. PATENT DOCUMENTS
3,368,326 A * 2/1968 Hervert ........................ 96/109

| | | | |
|---|---|---|---|
| 2002/0112458 A1* | 8/2002 | Schneider et al. ............. | 55/481 |
| 2005/0103341 A1* | 5/2005 | Deane et al. ........... | 128/204.26 |
| 2005/0223902 A1* | 10/2005 | Lovell ......................... | 96/134 |
| 2008/0237142 A1* | 10/2008 | Carpenter et al. ........... | 210/741 |

* cited by examiner

*Primary Examiner*—Robert J Hill, Jr.
*Assistant Examiner*—Christopher P Jones
(74) *Attorney, Agent, or Firm*—Birch, Stewart, Kolasch & Birch, LLP

(57) ABSTRACT

The invention is an assembly structure that allows molecular sieves and can-filters be fast assembled in an oxygen concentrator. The structure includes: a molecular sieve and can-filter set, which is composed of at least two molecular sieves and at least one can-filter; a support frame, which includes a base plate and a frame fixed on the base plate in an upright position, and the frame has a first support plate having a plurality of through holes and a second support plate having a hole, wherein the hole of the second support plate is for one of the at least one can-filter to pass through; and a plurality of bend joints, each of which including: a thin plate portion formed at a first end, wherein an opening is provided in the center of the thin plate portion; and a plurality of annular barbed portions provided near a second end, such that a flexible conduit/hose connected thereto does not detach easily and the air tightness is increased, wherein the second end of each bend joint passes through one of the through holes of the first support plate while the thin plate portion of each bend joint is fixed to the first support plate via a second fastener.

5 Claims, 4 Drawing Sheets

QUICKLY ASSEMBLABLE STRUCTURE OF MOLECULAR SIEVES AND CAN FILTERS IN OXYGEN CONCENTRATOR

BACKGROUND OF THE INVENTION a) Field of the Invention

The invention relates to a quickly assemblable structure of molecular sieves and can-filters in an oxygen concentrator and, more particularly, to a quickly assemblable structure of molecular sieves and can-filters in a pressure swing adsorption oxygen concentrator for personal use or for use in households.

b) Description of the Related Art

The function of an oxygen concentrator is to provide oxygen at substantially higher concentrations than those of atmospheric air. The concentration of oxygen in atmospheric air is generally around 20%, but if the oxygen concentration is raised to around 30% to 35%, a person breathing such air after high-intensity exercise recovers from tiredness and releases pressure faster. Moreover, patients with respiratory problems, like asthma, need highly concentrated oxygen for medical and health care purposes.

Common methods used for supplying high concentration oxygen include: 1) pressure swing adsorption method (PSA), 2) electrolysis method, and 3) usage of oxygen tank. The PSA method is to obtain oxygen from atmospheric air, wherein through the work of molecular sieves in an oxygen concentrator, nitrogen in atmospheric air is absorbed, and thus the effect of continuously obtaining oxygen from air is achieved. The electrolysis method is to generate oxygen and hydrogen by liquid water electrolysis, and the oxygen is extracted for use. In using the oxygen tank, oxygen is first stored in liquid state and under high pressure in a steel cylinder—oxygen tank, and the oxygen is released from the tank when it is needed.

Since the PSA oxygen concentrator uses can-filters and molecular sieves to carry out oxygen generation, the can-filters and the molecular sieves need to be changed periodically. However, wires are conventionally used to secure a hose that is connected to a vent and needs to be removed during replacement, and so the replacement and assembling operations of molecular sieves and can-filters are complicated. Thus, the work is usually done by technicians, which is very inconvenient to users. In addition, the internal assembly of the oxygen concentrator is complex; thereby it is more difficult to disassemble and assemble the molecular sieves and can-filters. Moreover, the air tightness of the hose secured by wires is poor during air transportation, and so it is prone to air leakage. Also, most oxygen concentrators are bulky in size and heavy in weight, and thus are not suitable for use in automobiles or as portable devices.

For household or personal oxygen concentrators, safety, convenience, and reasonable pricing are important considerations. The invention is a design that made structural improvements to the PSA oxygen concentrators, making them more compact, lightweight, easier to assemble and replace consumables, and at a more competitive price. Therefore, the invention is more suitable for household or personal use.

BRIEF SUMMARY OF THE INVENTION

An object of the invention is to provide an assembly structure that allows molecular sieves and can-filters be fast assembled in an oxygen concentrator.

A quickly assemblable structure of molecular sieves and can-filters in an oxygen concentrator of the invention includes: a molecular sieve and can-filter set, which includes a molecular set having at least two molecular sieves and a can-filter set having at least one can-filter, wherein the molecular sieves and the can-filter are connected as a whole by brackets and a plurality of first fasteners; a support frame, which includes a base plate and a frame mounted on the base plate in an upright position, wherein the frame includes a first support plate having a plurality of through holes and a second support plate having a hole for one can-filter of the can-filter set to pass through; and a plurality of bend joints, each bend joint being a bend structure and comprising: a thin plate portion formed at a first end of the bend structure and having an opening in the center of the thin plate portion; and a plurality of annular barbed portions provided near an aperture of a second end of the bend structure, wherein when each bend joint is connected with a hose, the annular barbed portions prevent the hose from detaching therefrom and increase air tightness. The second end of each bend joint passes through one of the through holes in the first support plate and the thin plate portion of each bend joint is secured to the first support plate of the frame by a plurality of second fasteners.

Moreover, the molecular sieve and can-filter set further includes a plurality of inlet/outlet pipes for inserting into the openings in the center of the thin plate portion of the bend joints, whereby the molecular sieve and can-filter set is also secured in the support frame.

Also, an o-ring is further provided in the opening of each bend joint so as to provide good air tightness when each of the inlet/outlet pipes of the molecular sieve and can-filter set is inserted into the opening of each bend joint.

The second end of each bend joint can be arranged to be in any required direction so as to cope with a hose connected thereto.

DETAILED DESCRIPTION OF THE INVENTION

Figure 1:
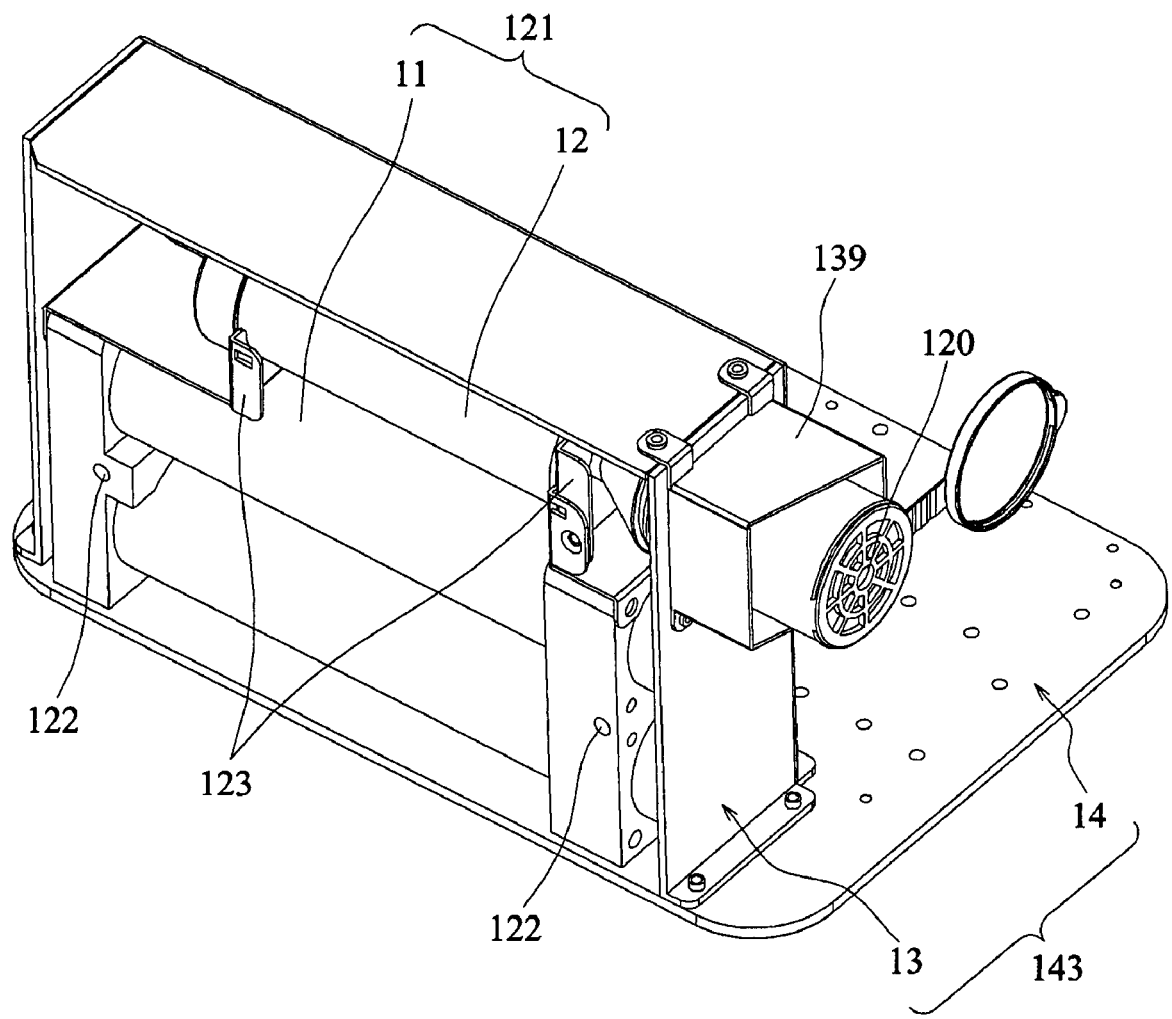
FIG. 1 is a pictorial view of a quickly assemblable structure of molecular sieves and can-filters according to an embodiment of the invention.

The quickly assemblable structure of molecular sieves and can-filters in oxygen concentrator according to preferred embodiments of the invention will be described in detail with reference to the drawings, in which like reference numerals denote like elements.

FIG. 1 is a pictorial view of a quickly assemblable structure of molecular sieves and can-filters in oxygen concentrator according to one embodiment of the invention. As shown in FIG. 1, the quickly assemblable structure of molecular sieves and can-filters includes: a molecular sieve and can-filter set 121, a support frame 143, and four bend joints 15 (shown in FIG. 3). The molecular sieve and can-filter set 121 includes a molecular sieve set 11 and a can-filter set 12, wherein the can-filter set 12 has an air inlet 120, and on the back side of the molecular sieve and can-filter set 121, four straight inlet/outlet pipes are provided (not shown). The support frame 143 is made of metal with good heat dissipation, like aluminum alloy, and includes a frame 13 and a base plate 14. Moreover, a support member 139 is mounted on the frame 13.

The molecular sieve set 11 of the molecular sieve and can-filter set 121 is composed of two molecular sieves, and the can-filter set 12 is composed of a first can-filter (unmarked) and a second can-filter (unmarked), wherein the air inlet 120 is on one end of the first can-filter. The molecular sieve and can-filter set 121 is formed by the can-filter set 12 being disposed above the molecular sieve set 11 by a plurality of brackets 123 and, first fasteners like screws. The main function of the molecular sieve and can-filter set 121 is first using the can-filter set 12 to filter impurities, vapor, and dust in air, and then using the molecular sieve set 11 to separate the wanted air components for use from filtered air delivered thereto.

Figure 2:
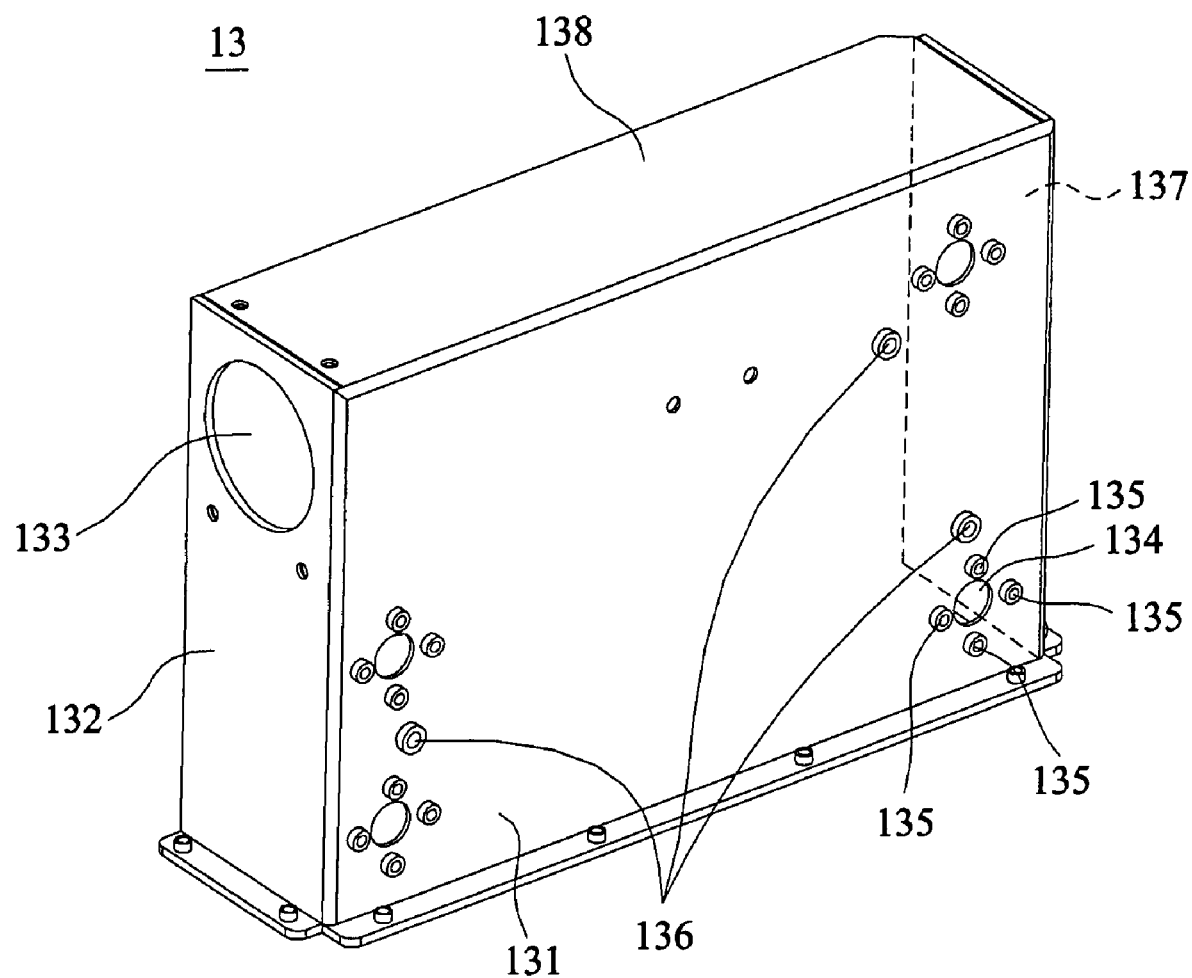
FIG. 2 is a pictorial view of a frame according to the same embodiment of the invention.

FIG. 2 is a pictorial view of the frame 13, illustrating the outer sides of the frame 13. Referring to FIGS. 1 and 2, the frame 13 is composed of a first support plate 131, a second support plate 132, a third support plate 137, and a fourth support plate 138. The second support plate 132 is coupled at its long side to one end of the first support plate 131 and is perpendicular thereto. The third support plate 137, having the same size as the second support plate 132, is also coupled at its long side to the opposite end of the first support plate 131 and is perpendicular thereto while facing the second support plate 132. These three support plates 131, 132, and 137 form a structure having a square C-shape when viewed from the top, wherein the opening of the square C-shape corresponds to the first support plate 131. The fourth support plate 138 is coupled to the top of the aforementioned three support plates 131, 132, and 137, and is perpendicular to all three. Thus, the frame 13 is formed. The frame 13 is mounted on the base plate 14 in an upright position, in which the fourth support plate 138 faces the base plate 14. In addition, the first support plate 131, as shown in FIG. 2, has four through holes 134 and a plurality of mounting holes 135 and 136, wherein one of the four through holes 134 and four of the plurality of mounting holes 135 constitute a set.

In a set, the through hole 134 is used to allow a second end of the bend joint 15 (will be described later) to pass through, and the four mounting holes 135, which are arranged around the through hole 134, are used to secure the bend joint 15. The three mounting holes 136 are for further securing the molecular sieve and can-filter set 121 in the support frame 143. Moreover, the second support plate 132 has a hole 133, and can further be provided with the support member 139 around the hole 133, as shown in FIG. 1. With such design, the end of the first can-filter of the can-filter set 12 that has the air inlet 12 is exposed outside of the support frame 143 while the other end of the first can-filter is passed through the support member 139 and the hole 133 to couple to the second can-filter. Hence, the first can-filter of the can-filter set 12 can be replaced directly from outside of the support frame 143 without a user having to disassemble the molecular sieve and can-filter set 121 in the support frame 143.

Figure 3:
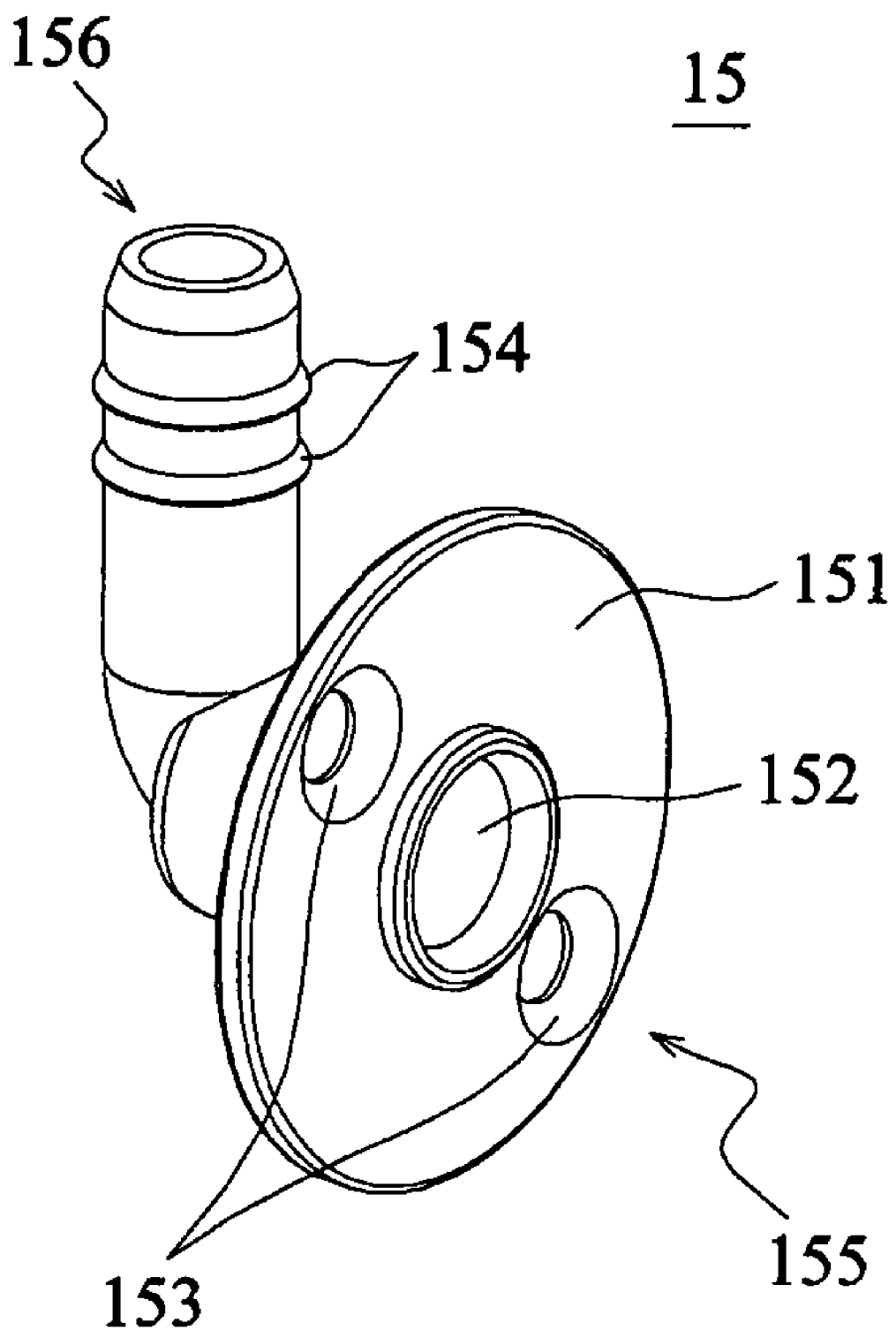
FIG. 3 is a pictorial view of a bend joint according to the same embodiment of the invention.

FIG. 3 is a pictorial view of one of the bend joints 15. The bend joint 15 is a 90 degrees bend structure and includes: a first end 155 that is provided with a disc-like thin plate portion 151, and a second end 156 that is provided with two annular barbed portions 154 near the periphery of a second end aperture. The use of the annular barbed portions 154 prevents a hose connected to the second end 156 from easy detachment even without the use of wire for fixation, and increases air tightness at connection. Additionally, the disc-like thin plate portion 151 of the first end 155 includes: an opening 152 provided in the center of the disc-like thin plate portion 151; and two mounting holes 153 used for coupling with other elements to secure the bend joint 15.

Figure 4:
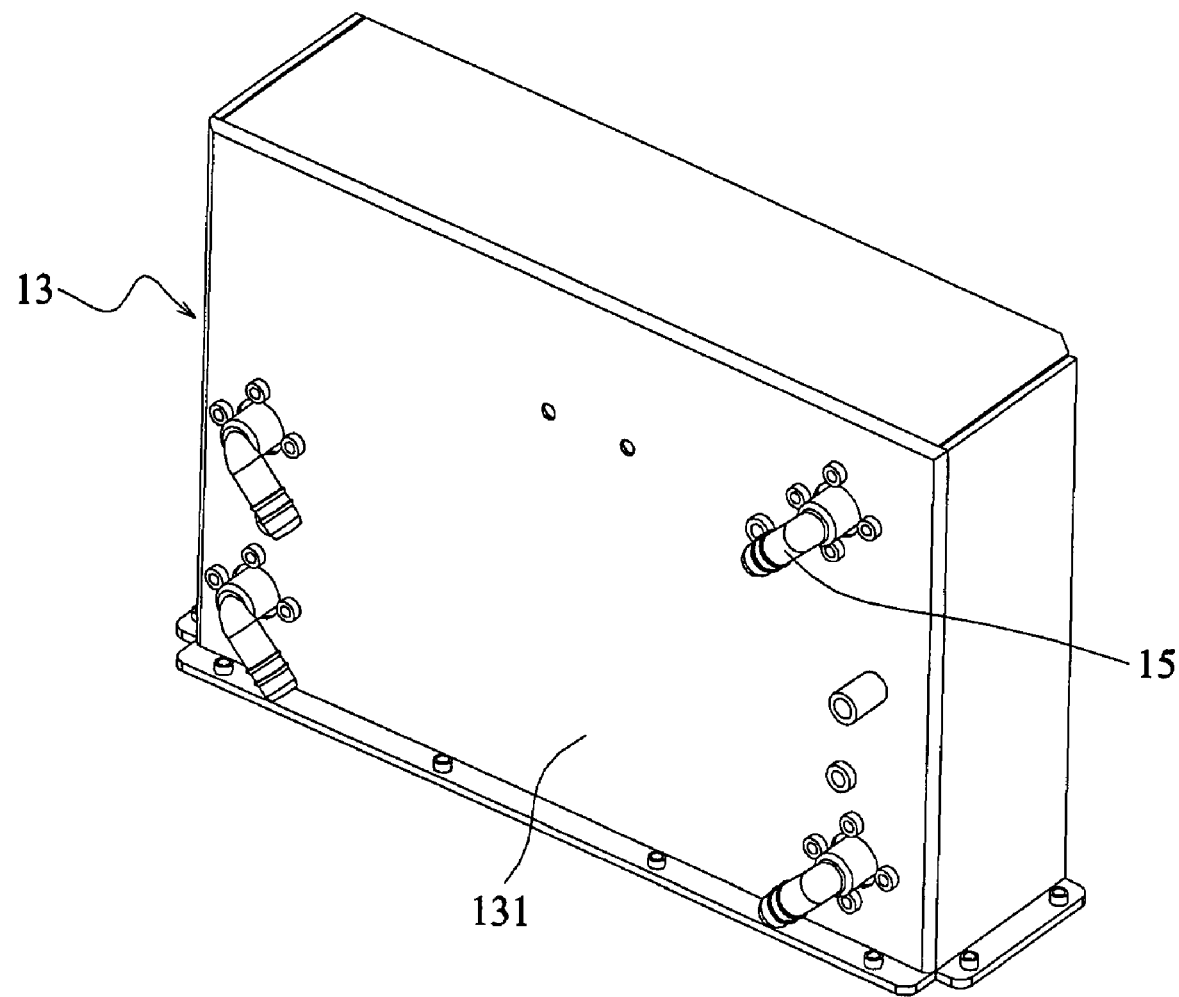
FIG. 4 is a pictorial view of a support frame having four bend joints mounted thereon according to the same embodiment of the invention.

Referring to FIGS. 2 and 3, a set of through hole 134 and mounting holes 135 is used as an example. The second end 156 of the bend joint 15 passes through the through hole 134 in the first support plate 131 from inside the frame 13, whereby the disc-like thin plate portion 151 of the first end 155 is lodged inside of the frame 13 and secured/mounted/fixed/attached to the first support plate 131 by a plurality of second fasteners. The plurality of second fasteners, like screws, are passed through the two mounting holes 153 in the disc-like thin plate portion 151 of the bend joint 15 from inside the frame 13 and, coupled to the mounting holes 135 around the through hole 134 in the first support plate 131, to securely mount the bend joint 15 on the first support plate 131. FIG. 4 is a pictorial view of the support frame 143, illustrating the outer sides of the support frame 143 with the four bend joints 15 being mounted thereon.

A set of through hole 134 and mounting holes 135 is used as another example. As shown in FIGS. 2 and 4, the four mounting holes 135 around the through hole 134 are pairwise arranged, wherein paired mounting holes 135 are on opposite sides of the through hole 134, and the two connecting lines between the paired mounting holes 135 are respectively perpendicular and parallel to a horizontal line. The mounting holes 135 are arranged in such a way that they can cope with the mounting holes 153 of the disc-like thin plate portion 151, so the bend joint 15 is secured by second fasteners (unmarked) while allowing the second end aperture of the bend joint 15 to face one of four different directions. FIG. 4 illustrates two of the four directions. The change of direction of the second end aperture by the bend joint 15 is to avoid bending/twirl in the hose connected thereto due to improper connect direction, wherein the bending/twirl may affect the smoothness of air flowing through them. Therefore, the space needed for connections is minimized. Also, the bend joint 15 is an integrally formed element, and the air tightness of which is better than the air tightness between pipe connections in the conventional technology.

Furthermore, the opening 152 in the center of the disc-like thin plate portion 151 is for one of the plurality of inlet/outlet pipes (not shown) of the molecular sieve and can-filter set 121 to insert therein and connect thereto. The molecular sieve and can filter set 121 is thereby affixed to a certain extent. Thus, a user does not have to detach wires and hoses and go through other complex steps like those in the conventional technology when disassembling the molecular sieve and can-filter set 121. An o-ring (not shown) is further provided in the opening 152 to improve the air tightness when one of the inlet/outlet pipes of the molecular sieve and can-filter set 121 is inserted into the opening 152 for connection.

In another embodiment, the positions of the mounting holes 135 in the first support plate 131 can be varied as needed, to cope with the mounting holes 153 in the disc-like thin plate portion 151, so the second end aperture of the bend joint 15 is arranged to be in a desirable direction. The aforementioned effect can also be achieved by changing the positions of the two mounting holes 153 in the disc-like thin plate portion 151.

In yet another embodiment, the disc-like thin plate portion 151 of the bend joint 15 is securely attached to the first support plate 131 by second fasteners (unmarked), and the second end 156 of the bend joint 15 is free rotating in the direction same as the circumference of the disc-like thin plate portion 151. The free rotation of the second end 156 of the bend joint 15 is convenient for selecting an installation direction to cope with the hose for connection, achieving the aforementioned effect.

The molecular sieves and the can-filters of an oxygen concentrator need to be replaced every six months or every year depending on condition of operation. According to the assemblable structure of molecular sieves and can-filters of the embodiments of the invention, only third fasteners, such as screws, on three mounting holes 122 (FIG. 1 only shows two of the three mounting holes) of the molecular sieve and can-fastener set 121, need to be removed when replacing molecular sieves or can-filters. The removal of the third fasteners allows the molecular sieve and can-filter set 121 to be detached from the support frame 143 as a whole, and it is not necessary to take out any wire or hose. It is convenient for the user to further disassemble the detached molecular sieve and can-filter set 121 for replacement of new molecular sieve or filter. Similarly, to install the replaced molecular sieve and can-filter set 121, the user just needs to insert all of the plurality of inlet/outlet pipes on the back side of the molecular sieve and can-filter set 121 into the openings 152 of the corresponding bend joints 15 and fasten the aforementioned three screws. The inlet/outlet pipes are secured in the openings 152, and the three screws fasten the mounting holes 122 of the molecular sieve and can-filter set 121 and further secure with the corresponding mounting holes in the support frame 143, to complete the assembly. No hose or wire is needed in the assembling process. Moreover, the o-ring provided in the opening 152 improves the air tightness at all connecting sections of the plurality of inlet/outlet pipes of the molecular sieve and can-filter set 121 and the plurality of bend joints 15.

From the aforementioned content, it is observed that the use of the plurality of bend joints 15 in substitution of the conventional use of wire to secure pipe connections provides more convenience to users in detaching and assembling the molecular sieve and can-filter set. Also, the air tightness is improved in comparison to the conventional technology, and the cost is lowered. In addition, according to the embodiments of the invention, the space occupied by the entire molecular sieve and can-filter set is minimized, and thus the size of an oxygen concentrator using the molecular sieve and can-filter set of the invention is reduced. Hence, it is convenient for use in the automobile or as a portable device.

Another embodiment of the invention discloses an assemblable structure of molecular sieves and can filters similar to that of the aforementioned embodiments, wherein the differences are that the molecular sieve set includes two or more molecular sieves, and the can-filter set includes one or more can-filters.

According to yet another embodiment of the invention, which is similar to the aforementioned embodiments, the structure of the thin plate portion at one end of the bend joint can be disc-like or polygon shaped, and the second end can have one or more annular barbed structures.

According to yet another embodiment of the invention, which is similar to the aforementioned embodiments, the thin plate structure on one end of the bend joint can be mounted to the inside or outside of the first support plate.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretations so as to encompass all such modifications and similar arrangements.

What is claimed is:

1. A quickly assemblable structure of molecular sieves and can filters in oxygen concentrator, comprising: a molecular sieve and can-filter set, which comprises: at least two molecular sieves; and at least one can-filter; wherein the at least two molecular sieves and the at least one can-filter are connected as a whole by brackets and first fasteners; a support frame, which comprises: a base plate; and a frame mounted on the base plate in an upright position, which comprises: a first support plate having a plurality of through holes; and a second support plate, with a hole therein for one of the at least one can-filter to pass through; a plurality of bend joints, each of the plurality of bend joints being a bend structure and comprising: a thin plate portion formed at a first end of the bend structure and having an opening in the center of the thin plate portion; and a plurality of annular barbed portions provided near a second end of the bend structure; wherein as each of the plurality of bend joints is connected to a hose, the plurality of annular barbed portions prevent easy detachment of the hose and increase air tightness; wherein the second end of each bend joint is passed through one of the plurality of through holes of the first support plate, while the thin plate portion of each bend joint is secured to the first support plate of the frame via a second fastener; and a plurality of inlet/outlet pipes, for inserting into the openings of the center of the thin plate portion of the bend joints, to secure the molecular sieve and can-filter set in the support frame.

2. The quickly assemblable structure of molecular sieves and can-filters as described in claim 1, wherein the molecular sieve and can-filter set is further secured in the support frame by a third fastener.

3. The quickly assemblable structure of molecular sieves and can-filters as described in claim 1, wherein an O-ring is provided in the opening of the thin plate portion of each bend joint to give good air tightness when each inlet/outlet pipe of the molecular sieve and can-filter set is inserted into the opening of each bend joint.

4. The quickly assemblable structure of molecular sieves and can-filters as described in claim 1, wherein the second end of each bend joint is arranged to be in any direction required by the hose connected thereto.

5. The quickly assemblable structure of molecular sieves and can-filters as described in claim 1, wherein the support frame is made of aluminum alloy material.

* * * * *